Oct. 20, 1970   C. G. KESSELRING   3,534,999

AUTOMOBILE GLARE VISOR

Filed April 19, 1968

INVENTOR:

CARL G. KESSELRING

United States Patent Office 3,534,999
Patented Oct. 20, 1970

3,534,999
AUTOMOBILE GLARE VISOR
Carl G. Kesselring, Rte. 2, Council Bluffs, Iowa 51501
Filed Apr. 19, 1968, Ser. No. 722,739
Int. Cl. B60j 3/02
U.S. Cl. 296—97                                11 Claims

ABSTRACT OF THE DISCLOSURE

A transparent automobile glare visor for attachment to the opaque standard sun visor in which a tinted transparent sheet is mounted on an opaque visor engaging clamp by means of a pivot shaft, with pivoting restrained by a friction maintaining spring wound around the pivot shaft.

FIELD OF THE INVENTION

This invention is in the field of transparent glare visors which are attachable to opaque standard sun visors for automobiles.

DESCRIPTION OF THE PRIOR ART

In the prior art various tinted glare visors have been proposed for attachment to the standard opaque visor. However, these have had higher cost of manufacture than necessary. Some have had excessive bulk so that when stored in glove compartments of automobiles, they take up more space than necessary.

A particular disadvantage of prior art glare visors has been their excessive weight which tends to have two disadvantages:

(1) This weight tends to pull the opaque visor down, out of a desired partially horizontal position, under the vibration of the car and particularly whenever the opaque standard visor is not firmly held from rotation itself, as is frequently the case.

(2) The excessive weight of the tinted visors has tended to put excessive strain on the means available for holding them in a horizontal positions, whereby they, too, tend to fall downwardly out of a semi-horizontal position into a vertical position, as is often times undesired.

SUMMARY OF THE INVENTION

A transparent automobile glare visor for attachment to the opaque standard sun visor in which a tinted transparent sheet is mounted on an opaque visor-engaging clamp by means of a pivot shaft, with pivoting restrained by a friction maintaining spring wound around the pivot shaft, whereby the spring coiled around the shaft provides sufficient friction to hold the tinted transparent visor horizontal when desired without it falling down, as would be a nuisance.

A particular objective is to achieve enough frictional pressure with a spring mounted on a shaft urging a pivot block toward a mounting block to make it possible to hold the visor horizontal by that means alone, whereby a second clamp and a second spring friction assembly are not necessary, for eliminating the weight of the second clamp and second spring friction assembly, whereby this unnecessary eliminated weight is not continuously pulling the main opaque visor out of a desired horizontal position under the vibration of road travel.

A second advantage gained by eliminating the need for a second spring friction assembly and a second clamp is that it makes it possible for a driver to take a sun visor stored in his glove compartment and clamp it on his main visor with but one hand, leaving his other hand free for handling the steering wheel. This is in contrast to a situation in which there are two spring clamps and two spring friction assemblies and in which the attachment of two clamps would be a two-handed operation and it would be necessary to go to the trouble of stopping the car before the glare visor could be safely attached.

DESCRIPTION OF THE PREFERRED EMBODIMENT

Figure 1:
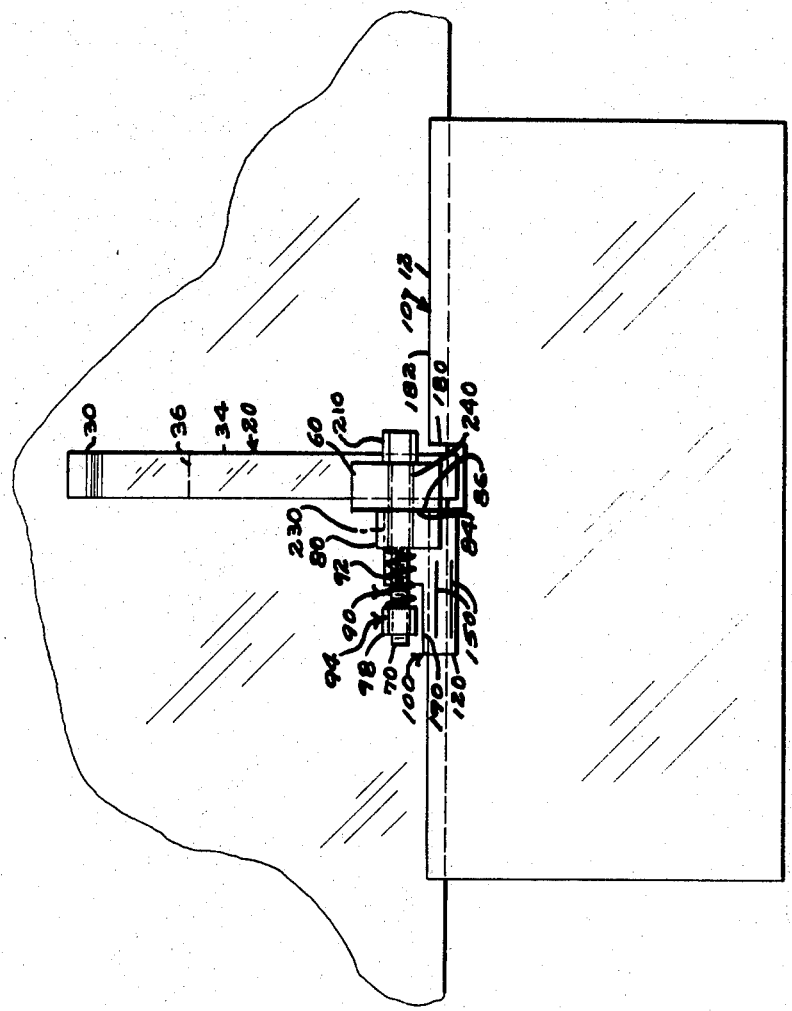
FIG. 1 is a side elevation of the automobile glare visor of this invention shown as connected to the convential opaque visor of an automobile, most of which latter is broken away. The opaque visor and the transparent glare visor are both shown in FIG. 1 in vertical positions and as they would be seen by a driver looking forwardly.

The automobile glare visor of this invention is generally indicated at 10 and comprises a tinted transparent sheet 12 preferably of substantially rectangular shape.

A clamp generally indicated at 20 is of the substantially U-shaped type and preferably formed of resilient material such as spring steel or plastic, the clamp having two engaging portions 30 and 32 which are movable with respect to each other by springing the two sides of the clamp 34 and 36 apart. The engaging portions 30 and 32 each form a part of the sides 34 and 36 respectively and they face each other and are disposable one on each side of a conventional opaque sun visor 40 of an automobile, which latter is shown in a down-swung vertical position in FIGS. 1 and 2, a position conventional when a bright glaring sun is shining in through the windshield.

The rearward side 44 of the standard opaque visor 40 is the one that faces the driver when the standard visor 40 is in a downwardly swung position.

The clamp sides 34 and 36 are connected by an end portion 46 and, as the clamp is completely formed of resilient material, this forms a means urging the engaging portions 30 and 32 toward each other for clamping against the opaque visor 40.

The clamp 20 has an opaque visor receiving recess means 50 extending inwardly thereof in a position between the engaging surfaces 30 and 32 so the clamp can be slid on a visor quickly.

A mounting block, or first pivot connection means 60 is attached to the clamp 20 by suitable means such as welding at 62 since the mounting block can be made of metal, or the block 60 can be made of plastic and the securing means at 62 can be a bonding material.

A shaft 70 is mounted on the protrudes from the mounting block 60. A pivot block 80 is rotatably mounted on the shaft 70 and is disposed alongside the mounting block 60 preferably in frictional engagement therewith since the blocks 60 and 70 have parallel frictionally engaged surfaces 84 and 86 disposed in planes at a right angle to the shaft 70.

An urging assembly is generally indicated at 90 and comprises a resilient means or coiled spring 92 which is disposed extending helically about the shaft 70 in engagement with that side of the pivot block 80 which is opposite to the mounting block 60.

The urging assembly 90 further comprises a retainer assembly 94 mounted on the shaft 70 for retaining the resilient member 90 in a position mounted on and surrounding the shaft 70.

The retainer assembly 94 comprises threads 96 on the shaft 70 and a nut 98 threadedly mounted on the shaft 70 in a position on the opposite side of the spring 92 from the pivot block 80.

Figure 2:
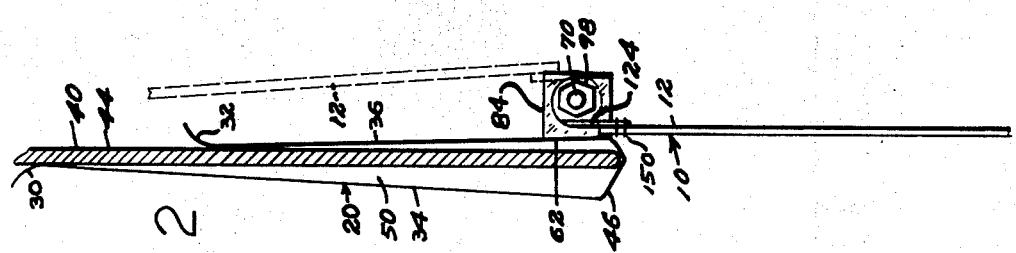
FIG. 2 is a view of the parts of FIG. 1 as seen from the left-hand side thereof, a storage position of the auxiliary glare visor of this invention being shown in FIG. 2 in dotted lines.

The pivot block 80 is attached to the tinted transparent sheet 12 by an attachment means generally indicated at 100 and comprising preferably a metallic member 120, which latter is welded to the preferably metallic pivot block 80 by welding at 124, as best seen in FIG. 2. The metallic member 120 is chosen to be metallic because of its possibility of a very strong welded connection to the relatively small pivot block 80 and since the member 120 can be of an opaque substance without great disadvantage because it does not extend down below the opaque main conventional sun visor 40 a substantial distance at times when the tinted sheet 12 is in a position of parallelism projecting downwardly and outwardly from the opaque visor 40, as seen in FIG. 1.

Therefore, the strength of having member 120 of metallic material is useful whereby it can be attached to the tinted sheet 12 by means of staples 150.

It is important to recognize that the sheet 12 need not have a metallic frame around it as would add to its weight, and that it is strong enough to serve its purposes and is, therefore, lighter than if it had a frame, although it is to be understood that this invention is not limited to the idea of having the sheet 12 frameless.

The sheet 12 has a clamp-receiving notch 180 in that notch 180 in that one of its edges 182 which is disposed closest to the clamp 20 in order that the sheet 12 can be swung into the position shown in FIG. 2, or even forwardly of the position shown in FIG. 2, or in other words, to the left of the position shown in FIG. 2 if desired, without interference from the clamp 20.

It will be seen that the transparent sheet 12, the pivot block means 80, the attachment means 100, and the spring 92, are all of a shape for permitting the sheet 12 to be swung through approximately 180 degrees about the axis of the shaft 70 without interference from the clamp 20 and as seen in FIG. 2 in which such a rotation is illustrated in moving the sheet 12 from the full-line position to the dotted-line storage position.

Whenever the spring 92 is found to lose some of its power, as springs often do, the operator can tighten the nut 98 and thereby be assured that the spring is exerting sufficient pressure.

The spring pressure will cause such friction along the surfaces 84 and 86 of the blocks 60 and 80 that the sheet 12 can be effectively held in place with a single set of spring and blocks mounted on a single clamp 20, whereby the necessity for an extra clamp 20 mounting a complete extra frictional rotation resistance assembly is not needed whereby the main visor 40 will not become as easily sagged with the weight of the transparent visor as it would be otherwise.

The plate 120 has a notch in its corner under the nut 98, and the notch shown at 190 permits more easy access to the nut 98.

It may be desirable to make the member 120 of clear plastic so as not to obstruct any of the vision through the sheet 12.

The shaft 70 is held in the mounting block 60 by means of a head 210 disposed on the opposite end of the shaft 70 from the nut 98 and on the opposite side of the block 60 from the block 80.

It is particularly important to notice that the bore 230 extending through the pivot block 80 is of a size for permitting free unthreaded rotation about the shaft 70. The shaft 70 can extend also through a bore 240 in the mounting block 60 which permits free and unthreaded rotation, although a threaded connection can be used there without disadvantage.

I claim:

1. An automobile glare visor assembly comprising a tinted transparent sheet, a clamp means having two engaging portions movable with respect to each other and facing each other and disposable one on each side of a conventional opaque sun visor of an automobile, said clamp means having releasable means urging said engaging portions towards each other for clamping against said opaque visor for securing said clamp means to said visor, said clamp means having an opaque visor receiving recess means extending inwardly thereof to a position between said engaging surfaces so said clamp can be placed on a visor, a first pivot connection means attached to said clamp means, a shaft mounted on and protruding from said first pivot connection means, a second pivot connection means rotatably mounted on said shaft and disposed alongside said first pivot connection means, urging means mounted on said shaft and urging said first and second pivot connection means toward each other, attaching means attaching said first pivot connection means to said transparent sheet whereby said sheet extends a substantial distance from said shaft means in a direction at a right angle to said shaft means, said urging means having substantial force so that the frictional engagement of said first and second pivot connection means against each other will hold said transparent sheet in a horizontal position against the forces of gravity and vibration of said automobile, said urging means having a force which is overcomable by an operator so that an operator can manually push on said sheet to rotate it about said shaft means, said urging means comprising a resilient means mounted on and surrounding said shaft and engaging one of said pivot connection means, and said urging means further comprising a retainer means mounted on said shaft and retaining said resilient means and said second pivot connection means on said shaft, all parts of said glare visor assembly being of a shape for permitting said sheet to be swung through approximately 180 degrees about said axis without interference therefrom so that said sheet can be stored in substantial parallelism with and above said conventional opaque visor when the latter is in horizontal storage position, and in which said attaching means for attaching said second pivot connection means to said transparent sheet comprises a lapping member having a side adjacent to and lapping said sheet near the edge of said sheet which is closest to said first pivot connection means, and means attaching said lapping member to said sheet.

2. The combination of claim 1 in which said lapping member is metallic.

3. The combination of claim 1 in which said lapping member has a flat side portion parallel to said sheet.

4. The combination of claim 1 in which said means attaching lapping member to said sheet comprises a staple.

5. The combination of claim 1 in which said second pivot connection means and said lapping member are both formed of metal and are welded together.

6. The combination of claim 1 in which said clamp means has two sides which are urged towards each other and which are joined by an end portion, there being nothing between said clamp sides to prevent their engagement with opposite sides of said opaque visor.

7. The combination of claim 1 in which said clamp means has two sides which are urged towards each other and which are joined by an end portion, said clamp being adapted to assume a position such that the inner surfaces of its sides are not concave along the majority of their length.

8. The combination of claim 1 in which said clamp means has two sides which are urged towards each other and which are joined by an end portion, said sheet having an open notch in the upper side thereof through which said clamp extends whereby said clamp does not interfere as much with rotation of said glare visor.

9. The combination of claim 1 in which said retainer means comprises threads on said shaft, and a nut threadedly received on said shaft whereby the pressure of said resilient means is adjustable by rotation of said nut.

10. The combination of claim 1 in which said assembly is in combination with a conventional opaque visor with its clamp means attached to an edge thereof.

11. An automobile glare visor assembly comprising a tinted transparent sheet, a clamp means having two engaging portions movable with respect to each other and facing each other and disposable one on each side of a conventional opaque sun visor of an automobile, said clamp means having releasable means urging said engaging portions toward each other for clamping against said opaque visor for securing said clamp means to said visor, said clamp means having an opaque visor receiving recess means extending inwardly thereof to a position between said engaging surfaces so said clamp can be placed on a visor, a first pivot connection means attached to said clamp means, a shaft mounted on and protruding from said first pivot connection means, a second pivot connection means rotatably mounted on said shaft and disposed alongside said first pivot connection means, urging means mounted on said shaft and urging said first and second pivot connection means toward each other, attaching means attaching said first pivot connection means to said transparent sheet whereby said sheet extends a substantial distance from said shaft means in a direction at a right angle to said shaft means, said urging means having substantial force so that the frictional engagement of said first and second pivot connection means against each other will hold said transparent sheet in a horizontal position against the forces of gravity and vibration of said automobile, said urging means having a force which is overcomable by an operator so that an operator can manually push on said sheet to rotate it about said shaft means, said urging means comprising a resilient means mounted on and surrounding said shaft and engaging one of said pivot connection means, and said urging means further comprising a retainer means mounted on said shaft and retaining said resilient means and said second pivot connection means on said shaft, all parts of said glare visor assembly being of a shape for permitting said sheet to be swung through approximately 180 degrees about said axis without interference therefrom so that said sheet can be stored in substantial parallelism with and above said conventional opaque visor when the latter is in horizontal storage position, and in which said attaching means for attaching said second pivot connection means to said transparent sheet comprises a lapping member having a side adjacent to and lapping said sheet near that edge of said sheet which is closest to said first pivot connection means, and means attaching said lapping member to said sheet, and in which said clamp means has two sides which are urged toward each other and which are joined by an end portion, said mounting block being attached to a side of said clamp so that said shaft is at a side of said clamp.

References Cited
UNITED STATES PATENTS

| | | | |
|---|---|---|---|
| 1,419,322 | 6/1922 | Smith | 296—97 |
| 1,445,918 | 2/1923 | Sterling | 296—97 |
| 1,470,553 | 10/1923 | Church | 296—97 |
| 3,035,864 | 5/1962 | Davidson | 296—97 |
| 3,261,638 | 7/1966 | Weingarten | 296—97 |

LEO FRIAGLIA, Primary Examiner

J. A. PEKAR, Assistant Examiner